United States Patent
Zeljkovic

[11] Patent Number: 5,778,341
[45] Date of Patent: Jul. 7, 1998

[54] METHOD OF SPEECH RECOGNITION USING DECODED STATE SEQUENCES HAVING CONSTRAINED STATE LIKELIHOODS

[75] Inventor: Ilija Zeljkovic, Westfield, N.J.

[73] Assignee: Lucent Technologies Inc., Murray Hill, N.J.

[21] Appl. No.: 592,751

[22] Filed: Jan. 26, 1996

[51] Int. Cl.$^6$ ............................................. G10L 5/06
[52] U.S. Cl. ............................................. 704/256; 704/240
[58] Field of Search ........................... 395/2.65, 2.64, 395/2.6, 2.45, 2.49–2.51; 704/236, 240–242, 251, 255, 256

[56] References Cited

U.S. PATENT DOCUMENTS 5,617,509   4/1997   Kushner et al. ............... 395/2.65

OTHER PUBLICATIONS

Rabiner, L. R., "A Tutorial of Hidden Markov Models and Selected Applications in Speech Recognition", Proc. IEEE, vol. 77, No. 2, pp. 257–286, Feb. 1989.

Ramesh, P., Wilpon, J.G., "Modeling State Durations in Hidden Markov Models for Automatic Speech Recognition", Proc. ICASP 1992, vol. 1, pp. 381–384, Apr. 1992.

Rabiner, L. R., Wilpon, J. G. and Juang, B. H., "A Model-Based Connected-Digit Recognition System Using Either Hidden Markov Models or Templates", Computer, Speech and Language, vol. 1, No. 2, pp. 167–197, Dec. 1986.

Rabiner, L. R., Wilpon, J.G., and Juang, B.H., "A Segmental k-means Training Procedure for Connected Word Recognition Based on Whole Word Reference Patterns," AT&T Tech. Journ., vol. 65, No. 3, pp. 21–31, May 1986.

Wilpon, J.G., et al "Connected Digit Recognition for Telecommunication-based Applications", BLTechnical Memorandum BL011226–931125, Nov. 1994.

Primary Examiner—Kee M. Tung

[57] ABSTRACT

The invention is a speech recognition system and method for transmitting information including the receipt and decoding of speech information such as that modeled by hidden Markov models (HMMs). In this invention, the state likelihoods of the modeled state sequences contained within the speech information are assigned penalties based on the difference between those state likelihoods and a maximum possible state likelihood. Once penalties have been assigned, the modified state sequence with the modified state likelihoods having the highest cumulative state likelihoods is used in further speech recognition processing. In this manner, state sequences having no extremely poor state likelihoods are favored over those having both extremely high and extremely poor state likelihoods.

18 Claims, 3 Drawing Sheets

METHOD OF SPEECH RECOGNITION USING DECODED STATE SEQUENCES HAVING CONSTRAINED STATE LIKELIHOODS

BACKGROUND OF THE INVENTION

A. Field of the Invention

The invention relates to decoding input signals including speech information input signals. More particularly, the invention relates to recognizing speech signals using optimal state sequences with smooth state likelihoods.

B. Description of the Related Art

Many systems, e.g., communication, data processing and other information systems, can be described or characterized in terms of a series of transitions through a set of states. In speech recognition systems, methods such as Markov models are known that use probabilistic modeling to pattern the sequence of acoustic features of a speech pattern (e.g., a word) into a series of transitions through a set of states based on statistical estimates. Such modeling yields one or more state sequences.

A known variation of Markov models includes hidden Markov models (HMM). The basic premise of HMMs is that a speech signal or system of speech signals can be characterized as a parametric random process having one or more sequences of states, and that the parameters of these sequences can be determined in a precise manner. Once the parameters of these state sequences are derived, additional methods are used to determine the most likely state sequence. An example of determining the most likely state sequence, i.e. the maximum or optimum likelihood state sequence, is the use of the Viterbi algorithm, which is a known optimization technique.

In decoding state sequences within speech recognition systems, e.g., HMM-based speech recognition systems, recognition errors are reduced by introducing penalties at certain locations to enhance the existing errors and thus assist the speech recognition in identifying those errors. Conventionally, recognition errors are reduced in this manner by introducing penalties such as state and word duration penalties, insertion penalties, energy penalties (see, e.g., Rabiner, L. R., "A Tutorial of Hidden Markov Models and Selected Applications in Speech Recognition", *Proc. IEEE*, Vol. 77, No. 2, pp. 257–286, February 1989; and Ramesh, P., Wilpon, J. G., "Modeling State Durations in Hidden Markov Models for Automatic Speech Recognition", *Proc. ICASP* 1992, Vol. 1, pp. 381–384, April 1992). In this conventional manner, the penalties introduced are independent of state likelihood values, and introduced upon a number of state transition occurrences exceeding a threshold or when observation sequence energy deviates from the reference energy distribution.

A more effective method for reducing recognition errors in information systems including speech recognition systems is sought.

SUMMARY OF THE INVENTION

The invention is a system and method of speech recognition for information such as that modeled by hidden Markov models (HMMs). In particular, it is a system and method for transmitting information including the receipt and decoding of speech information in which the state likelihoods of the modeled state sequences are assigned penalties based on the difference between those state likelihoods and a maximum possible state likelihood. Once penalties have been assigned, the modified state sequence with the modified state likelihoods having the highest cumulative state likelihoods is used in further speech recognition processing. In this manner, state sequences having no extremely poor state likelihoods are favored over those having both extremely high and extremely poor state likelihoods.

DETAILED DESCRIPTION

Figure 1:
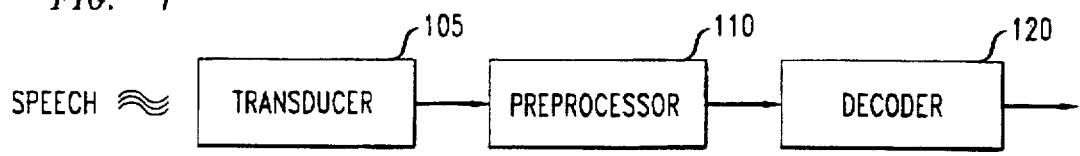
FIG. 1 is a functional block diagram of a speech recognition system.

In the following description similar components are referred to by the same reference numeral in order to simplify the sequential aspect of the drawings.

The present invention relates to efficient decoding of input signals. Although the invention is described in the context of speech recognition, it has broader applications. For example, the invention may be useful in other communication, data and information systems that employ statistical modeling. For clarity of explanation, embodiments of the present invention are presented herein as functional blocks. The functions that these blocks represent may be provided through the use of either shared or dedicated hardware, including, but not limited to, hardware capable of executing software. Furthermore, the use of the term "processor" should not be construed to refer exclusively to hardware that is capable of executing software. Some embodiments may comprise both hardware such as a digital signal processor (DSP) and software for performing the operations discussed below. Very large scale integration (VLSI) hardware embodiments of the present invention, as well as hybrid DSP/VLSI embodiments, may also be provided.

Figure 3:
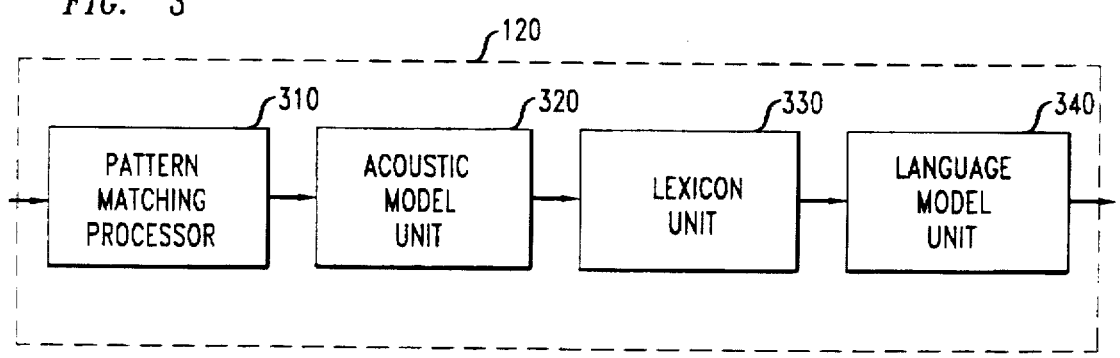
FIG. 3 is a functional block diagram of the decoder of the speech recognition system of FIG. 1.

FIG. 1 is a functional block diagram of the speech recognition system in accordance with the present invention. Speech is converted to an analog signal using a transducer 105, such as a microphone. A preprocessor 110 receives the speech signal and converts it into a digital form embodying speech features that facilitate subsequent recognition by decoder 120. The decoder transforms the digital signal into an appropriate word or sequence of words. Typically, the decoder is constrained by a set of acoustic models that correspond to basic units of speech (e.g., phonemes, syllables and words), a lexicon that defines the vocabulary of the decoder in terms of the basic units, and a language or grammar model that specifies allowable sequence of vocabulary terms. These functional units are illustrated in FIG. 3 and are mentioned later.

Figure 2:
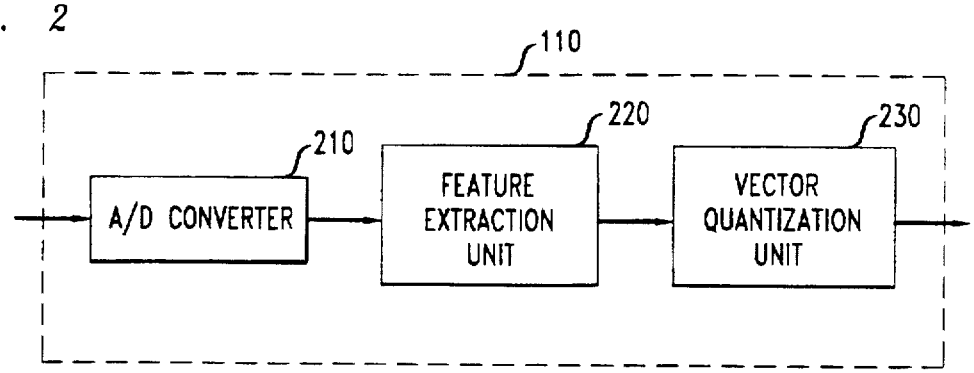
FIG. 2 is a functional block diagram of a signal preprocessor of the speech recognition system of FIG. 1.

FIG. 2 is a detailed functional block diagram of preprocessor 110. Preprocessor 110 comprises, e.g., an analog to digital (A/D) converter 210, a feature extraction unit 220, and a vector quantization unit 230.

A/D converter 210 receives input analog speech waveform signals and transforms them into corresponding digital signals. Illustrative A/D converters may include an anti-aliasing filter and sometimes a high frequency preemphasis filter to spectrally flatten the analog signal. The signal is then digitized, for example, to 11 or 12 bits at a rate from approximately 6 kHz to 20 kHz. In general, the sampling rate is about twice the bandwidth of the communication channel. For example, the sampling rate of 8 kHz is the standard for a conventional telecommunication channel having a bandwidth of 4 kHz. The output of A/D converter 210 is a digital representation of the speech signal. This signal can be described as the product of a source spectrum, i.e., input analog speech signal, and the transfer function of the A/D converter's filters.

The feature extraction unit 220 provides a parametric representation of the speech signal. Conventional techniques such as a filter bank, Fourier transformation, Linear Predictive Coding (LPC), and/or Cepstral Analysis may be employed to obtain the parameters. Such techniques are described, e.g., in *Fundamentals of Speech Recognition*, L. R. Rabiner and B. H. Juang, Prentice Hall, 1993. The set of parameters, referred to as a "feature vector" (o), is computed from a frame of speech data defined by windowing a certain number of samples of the signal. Each frame represents an observation. Typically, the frame rate is less than the window width, i.e., overlapping frames, in order to avoid aliasing.

The feature vectors are calculated by shifting the window forward in time. Dependence of the spectral estimate on the exact temporal positions of the window may be reduced by using tapered windowing techniques such as Hamming windows (see, e.g., *Discrete-Time Signal Processing*, Allan V. Oppenheim and Ronald W. Schafer, Prentice Hall, 1989). Although the frame rate and window width may vary depending on the application, the typical frame rate is from approximately 10 to 20 milliseconds (msec) and the window width is approximately 30 msec.

Each feature vector contains a number of numeric measurements, say d, or other information derived from the waveform using the above-mentioned technique. Typically, approximately 10–20 basic features are included, along with their first and second derivatives. Accordingly, the input voice signal is transformed into a sequence of feature vectors constituting, e.g., an observation sequence, $O=(o_1, o_2, \ldots o_n)$, having n number of feature vectors.

The optional vector quantization unit includes a "codebook" listing speech labels that are feature vectors, which have been computed by conventional training techniques such as k-mean segmentation (as described in Rabiner et al., "A Segmental k-means Training Procedure For Connected Word Recognition Based on Whole Word Reference Patterns", *AT&T Tech. Journal*, Vol. 65, No. 3, p. 21–31, May 1986). The feature vector in each frame is compared with the entries in the codebook. The speech label that matches best with the feature vector becomes the feature vector for that frame for further processing. The quantized sequence of feature vectors are passed to the decoder for recognition.

FIG. 3 is a detailed functional block diagram of decoder 120, which transforms the sequence of feature vectors received from preprocessor 110 to a sequence of speech units. As shown, decoder 120 comprises a pattern matching processor 310, an acoustic model unit 320, a lexicon unit 330, and a language model unit 340.

Acoustic model unit 320 stores an inventory of speech units, such as phonemes, words, syllables, or other units recognized by decoder 120, each represented by a Hidden Markov Model (HMM), which has been generated by a training processor (not shown). As mentioned previously, a HMM is a statistical technique for modeling unknown processes.

In general, each HMM is represented by a state diagram having N number of states, vectors defining transitions between certain pairs of those states, probabilities that apply to state-to-state transitions, a set of probabilities characterizing M number of observed output symbols within each state, and initial conditions. Since there are a number of output observations for each state of the HMM, a given observation sequence can be generated from various paths or state sequences. In speech recognition applications, states are assumed to model intervals of speech with roughly stationary acoustic features. A probability density function (pdf) is associated with each state. The pdf characterizes the output probability distribution that models variability in spectral features or observations associated with that state. Transition probabilities model durational variability in the speech signal.

Typically, the training processor generates the HMM parameters for a unit by receiving an input signal, i.e., a training token, representing the target unit repeatedly to obtain the feature vector series. The probability density of observation of the feature vectors occurring with the transition between states and the state transition probability in the model are obtained from the feature vector series to maximize the probability density of observation of the feature vectors. Once the HMM structure has been obtained, it is stored in memory and becomes part of the vocabulary of the acoustic unit.

An illustrative embodiment of the acoustic model unit stores speech units as well as background silence as left-to-right HMMs or Bakis models with continuous observation densities. In a left-to-right HMM, the underlying state sequence associated with the model has the property that, as time increases, the state index increases or stays the same. This restriction, which forces the system of model to proceed from left to right, reduces the number of paths corresponding to a given observation sequence.

Figure 4:
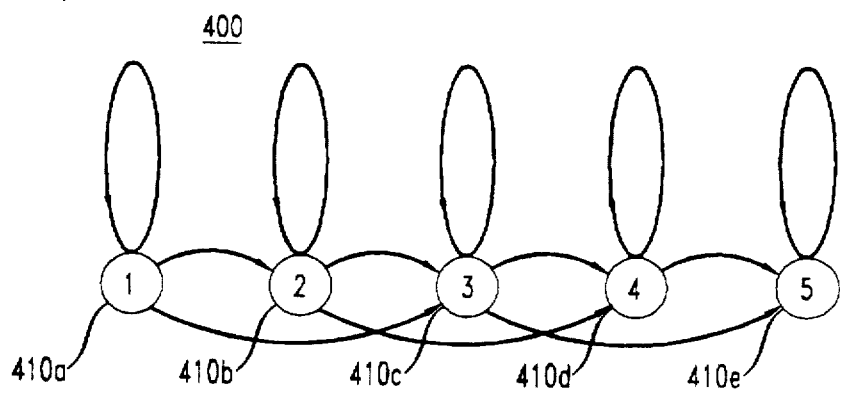
FIG. 4 is an illustrative example of a state diagram corresponding to a left-to-right Hidden Markov Model.

FIG. 4 illustrates an example of a state diagram representing a left-to-right HMM for modeling words or subwords. As previously described, words or subwords can be modeled as a sequence of syllables, phonemes, or other speech sound units that have temporal interpretation. Typically, each unit is represented by one or more states within the state diagram.

Illustratively, state diagram 400 contains 5 states, 410a–410e, to model a target word. As can be seen, the arrows of the state diagram, which correspond to the feature vectors, flow to states from left to right. The duration of the unit, i.e., phoneme, sound, etc., is accommodated by having a state transition to the same state. For example, a state may return to itself at a clock time to model sounds having longer durations. Generally, only intermediate states have self-transitions because the beginning and end states represent transitions into and out of the word or subword, respectively. Also, ergodic HMMs (in which every state can be reached from every other state) or other HMM structures may be employed to model the speech.

The state observation density function or pdf for state j of the state diagram, $b_j(o)$, is represented as a mixture of a finite number of Gaussians of the form:

$$b_j(o) = \sum_{m=1}^{M} c_{mj} N(o, u_{mj}, U_{mj})$$

where o is the vector being modeled, $c_{mj}$ is the mixture weight for the mth component in state j, and N represents a multivariant normal density. Typically, N is assumed to be Gaussian with mean vector $u_{mj}$ and covariance matrix $U_{mj}$ for the mth mixture component in state j. When $U_{mj}$ is assumed to be a diagonal matrix (i.e., a strictly left-to-right HMM), the state observation density can be simplified to:

$$b_j(o) \sum_{m=1}^{M} c_{mj} \frac{\prod_{d=1}^{D} e^{-(o^{[d]} - u_{mjd})^2 / 2\sigma^2_{mjd}}}{2(\pi)^{D/2} \left( \prod_{d=1}^{D} \sigma^2 mjd \right)^{1/2}}$$

where $o^{[d]}$ is the dth component of the observation vector, D is the number of components or features in o, $u_{mjd}$ is the $a^{th}$ component of $u_{mj}$ and $\sigma^2_{mjd}$ is the dth covariance of $U_{mj}$. The features of the observation vector, as well as their first and second derivatives, are derived from conventional spectral LPC and Cepstral analysis.

The HMM parameters c, U, and U are estimated from labeled speech that has been obtained from the training processor using a segmented k-means algorithm, e.g., as disclosed in Rabiner, et al., "A Segmental k-means Training Procedure for Connected Word Recognition Based on Whole Word Reference Patterns," *AT&T Tech. Journal.*, Vol. 65, No. 3, pp. 21–31, May 1986. State boundaries in each training token are determined, for example, by optimal (Viterbi decoding) alignment of the current model with the token. All frames from all training data assigned to a particular state are clustered into M clusters. From the vectors within each cluster, the parameters $u_{mj}$ and $U_{mj}$ are calculated, and mixture weights $c_{mj}$ are computed as the number of frames in a cluster divided by the total number of frames for the state.

Pattern matching processor 310 (see FIG. 3) receives the sequence of observation vectors, $O=(o_1, o_2, \ldots o_n)$, representing an unknown speech utterance and searches the network of HMMs stored in acoustic unit 320 to find a match. As previously discussed, the states of an HMM contain M number of outputs and each output has a different probability as defined by the pdf. As such, different HMMs can generate sequences with outputs matching that of the input observation sequence, each with a different probability.

Thus, the goal of the search process is to return the single most-likely state sequence, $Q=(q_1, q_2, \ldots q_n)$, that generated the sequence of observation vectors. In accordance with the invention, a Dynamic Programming (DP) technique is used to find the most-likely state sequence. The DP determines the likelihood score or accumulated probability of the most-likely state sequence in each HMM for an input observation sequence. The state sequence with the highest accumulated probability is the match.

In general, the accumulated probability of the most-likely state sequence in a HMM for a given observation having n frames, with each frame corresponding to a HMM state transition, is determined by adding the state log-likelihood of each of the n states starting with state 1 and ending at state n. The state log-likelihood is defined as:

$$l(i,n) = \log b_i(o_n)$$

where $l(i,n)$ and $b_i(o_n)$ are the state log-likelihood and pdf, respectively, for the nth observation at state i.

From this definition, the highest accumulated probability score along a state sequence path $(q_1, q_2, \ldots q_{n-1})$ for given HMMs ($\lambda$) for the input observation sequence $O=(o_1, o_2, \ldots o_n)$ is defined as follows:

$$\delta_n(i) = \max P[q_1, q_2, \ldots q_n = i, o_1, o_2, \ldots o_n | \lambda] q_1, q_2, \ldots q_{n-1}$$

where $\delta_n(i)$ is the best score or highest probability along a single path, at frame n, which accounts for the first n observations and ends in state i. As such, the highest probability score at frame=n is equal to:

$$\delta_n(j) = [\max \delta_{n-1}(i) a_{ij}] * b_j(o_n)$$

where $a_{ij}$ is the probability for the sequence to transition from state i to state j. For purposes of computational efficiency, the likelihood functions may be expressed in terms of log functions. Thus, the cumulative log-likelihood obtained for a path terminating at state i at frame n($L(i, n)$) is equal to:

$$L(i,n) = \max[L(k, n-1) + l(i,n)]$$

where the cumulative likelihood is maximized over all states k that precedes state i. For left-to-right HMMs, the cumulative likelihood becomes:

$$L(i, n) = \max[L(i, n-1) + l(i,n), L(i-1, n-1) + l(i,n)]$$

During each recursion, the state transition probabilities obtained during training are replaced by transition probabilities that set, e.g., equal throughout the network.

As can be seen, the cumulative log probabilities is the summation of the probabilities of the different states in the HMM. Some state probabilities within the cumulative log-probability may have low probabilities while others may have high ones. To increase the impact of the states having low probabilities, the inventive method assigns a penalty, which decreases the probability for states having a low state probability or likelihood. The penalty is based on the distance between that state likelihood and the likelihood of the best possible state. Such penalty assignment, in effect, gives states with poor state likelihoods more impact on the overall likelihood, thus favoring state sequences with no extremely poor likelihood states.

Figure 5:
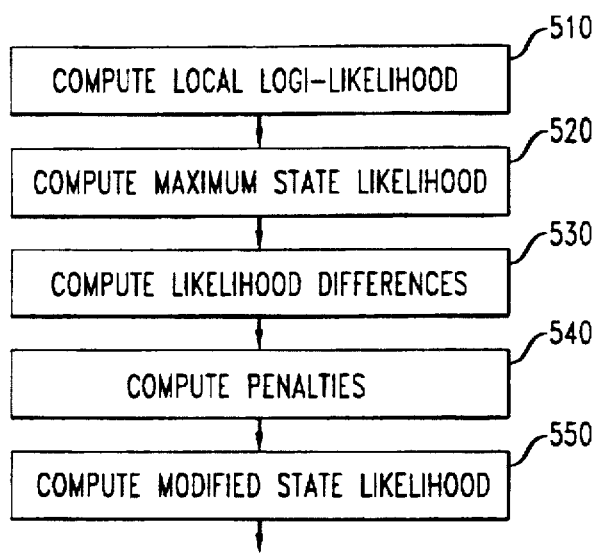
FIG. 5 is a flow diagram illustrating the smooth state probability decoding.

For example, the inventive method includes a smooth state probability decoding algorithm (SSPDA), whose steps are shown in FIG. 5. The flow diagram steps depict the assessment of the penalties in an illustrative embodiment. For a given observation sequence having n frames, the local log-likelihood of each n frame is computed at step 510 as follows:

$$l(i, n) \text{ for each state } i, i=1, N(n)$$

where N(n) are the active states falling within the pruning beam for frame n in case of a beam search decoder or all the states in the network when a full search is used. To speed up the computations, often only paths within certain beam widths are considered. At step 520, the maximum state likelihood, $l_{max}(n)$, for frame n is computed as follows:

$$l_{max}(n) = \max l(i, n); i=1, N(n)$$

At step 530, the distance, d, between each state likelihood and the maximum value is derived using the following relationship:

$$d(i, n) = l(i,n) - l_{max}(n)$$

This distance is used to determine the amount of penalty to assess to the state likelihood. At step 540, the penalty, p, is computed for each state likelihood using, for example, a smooth monatomic function such as a sigmoid function. The function should be chosen such that poor state likelihoods are made worse but the highest likelihoods are not changed. Such functions include, e.g., a sigmoid function or other monotonic function, or any other function that introduces low penalties for small values of d, and higher penalties for higher values of d. In another embodiment of the invention, a look-up table is used to determine the penalty. Although not required, the function can be task dependent.

Figure 6:
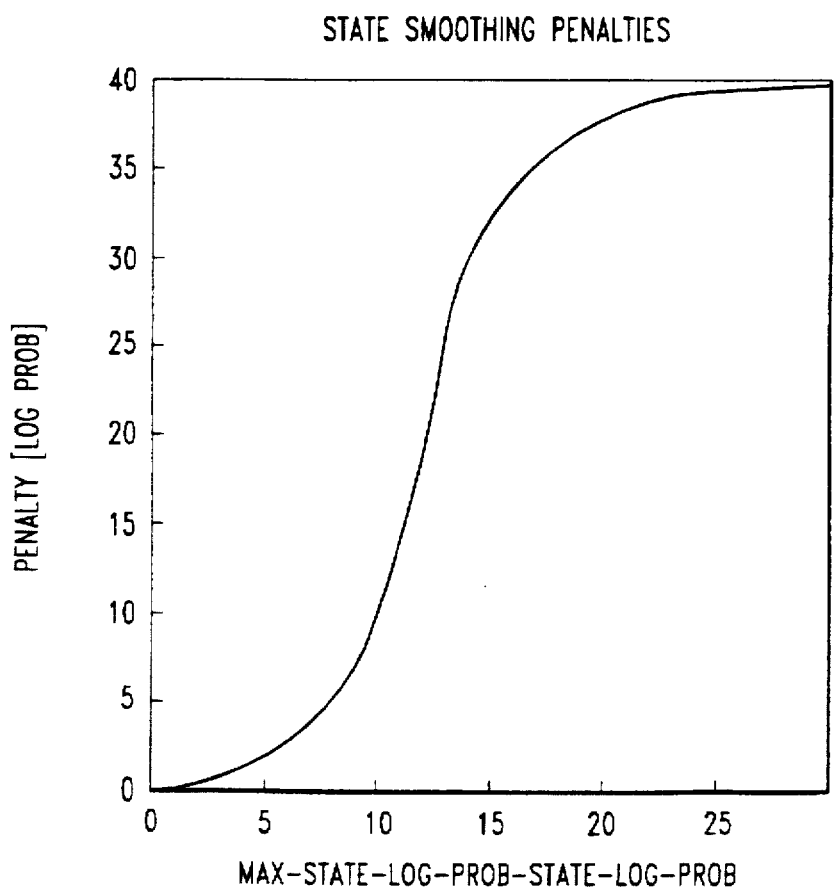
FIG. 6 is a plot of a sigmoid function used as a penalty function in an embodiment of the invention.

An illustrative embodiment calculates the penalty using the following sigmoid function:

$$p(i,n) = \frac{g}{1 + e^{-\gamma d(i,n)+\theta}} - \frac{g}{1 + e^\theta}$$

where g is the maximum allowable penalty, θ corresponds to the d(i, n) range width where low penalties are applied, and γ controls the slope of the transition between these two penalty regions. This function makes it convenient to define the d(i, n) range width where low penalties are applied and also to limit the maximum allowable penalty when state likelihoods fall beyond the d(i, n) range. For example, FIG. 6 illustrates this function for g=40, γ=0.5 and θ=5.

Once the penalty is obtained, it is included in the state likelihood for further processing at step 550. The modified state likelihood is as follows:

$$l'(i,n) = L(i,n) + p(i,n); \ i=1,N(n)$$

The state sequences having the highest cumulative modified state likelihood may then be determined in step 560 by adding the state log-likelihood of each of the states as previously described at page 8, lines 15–28 in connection with determining the most-likely state sequence, or using another known optimization technique such as the Viterbi algorithm as addressed at page 1, lines 18–22.

Figure 7A:
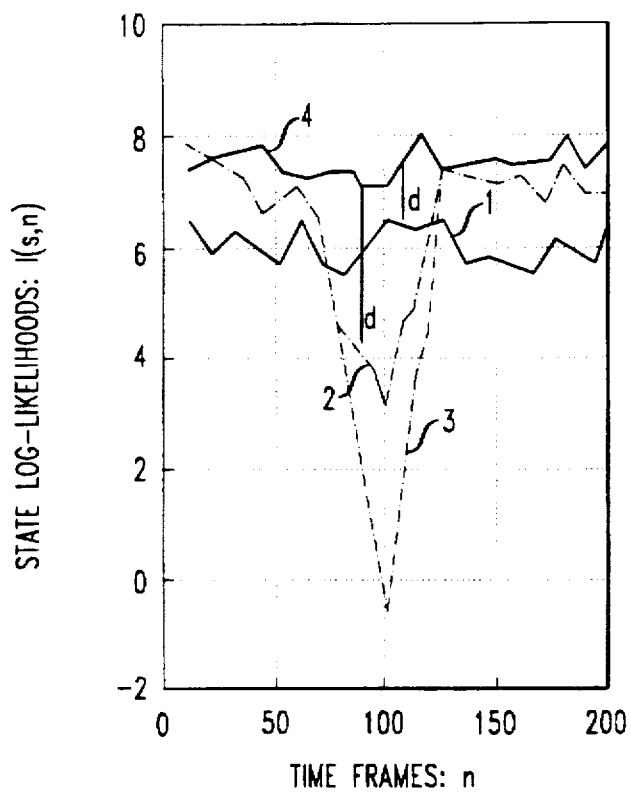
FIGS. 7a–b are example plots of state log-probability and cumulative log probability of state sequences corresponding to various hidden Markov models.
Figure 7B:
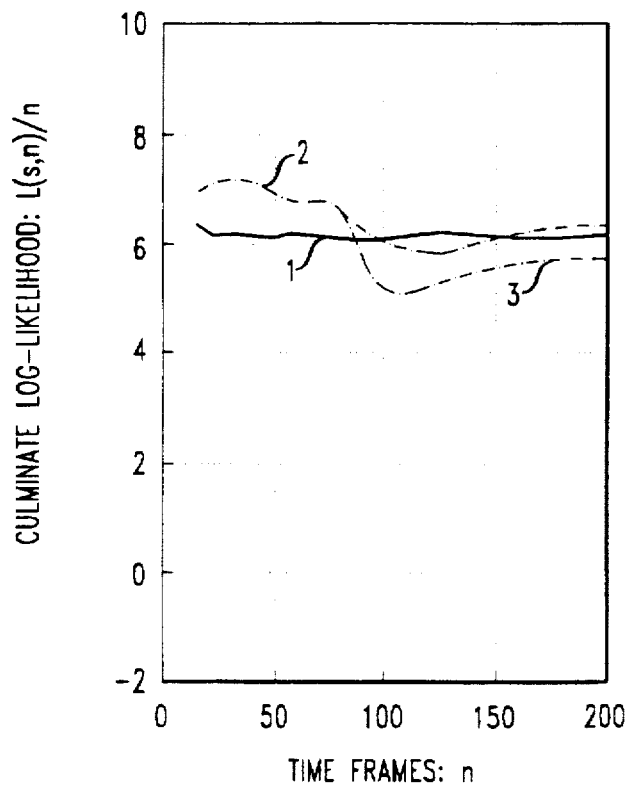

FIGS. 7a–b illustrate how state sequences having low state likelihoods are less likely to be selected as the most-likely state sequences using the inventive method, e.g., the SSPDA. FIG. 7a shows the state log-likelihood for various state sequences plotted as a function of time frames and FIG. 7b shows the corresponding cumulative log-likelihoods. Each time frame represents a state transition in a HMM. Line 4 shows the maximum state local likelihood for the input observation sequence representing breath noise for any of the states in all the HMMs stored in the acoustic unit. Line 1 shows the state likelihood for each state in the HMM representing background noise; line 2 shows the state likelihood for the HMM corresponding to the digit six.

From FIGS. 7a–b, it is seen that the beginning and end states for line 2 match more closely to the input breath noise than line 1, while the converse is true for the inner states. Consequently, the corresponding log-likelihoods for line 2 is higher than for line 1. This difference causes an error in recognition as the digit six is selected, instead of background noise, as the match for the input signal representing breath noise.

However, the recognition error is avoided by using the inventive method, e.g., the SSPDA. Line 3 in FIG. 7a is the resulting state log-likelihood plot for the HMM corresponding to the digit six after a penalty term according to the SSPDA has been added. The amount of the penalty is related to the distance d between the highest local state log-likelihood of the input observation sequence and the non-penalty assessed state log-likelihood for the digit six. The resulting poorer likelihood states, because of the penalty, have a greater distance from the line 4. Consequently, these states have a greater influence on the overall cumulative log-likelihoods. As shown in FIG. 7b, the cumulative log likelihood for the digit six using the SSPDA is less than that of background noise. Thus, the use of SSPD correctly recognizes input breath noise as background sound.

While the inventive method has been particularly shown and described with reference to various embodiments, it will be recognized by those skilled in the art that modifications and changes may be made to the statistical modeling methods herein described without departing from the spirit and scope thereof as defined by the appended claims and their full scope of equivalents.

What is claimed is:

1. A method for transmitting information including the receipt and decoding of speech information, said speech information including at least one state sequence having a plurality of states and given state likelihoods of transitions from state to state, the decoding of said speech information comprising the steps of:

comparing the state likelihoods of said state sequences of said speech information to a corresponding maximum state likelihood;

modifying said state likelihoods of said state sequences of said speech information based on the differences between the state likelihoods of said state sequences and said corresponding maximum state likelihood; and determining the state sequences of said speech information having the highest cumulative modified state likelihood.

2. The method as recited in claim 1, wherein said comparing step further comprises the steps of determining log-likelihoods for said state sequences and comparing those log-likelihoods to said corresponding maximum state likelihood, and wherein said modifying step further comprises modifying said state sequences based on the differences between the log-likelihoods of said state sequences and said corresponding maximum state likelihood.

3. The method as recited in claim 1, wherein said modifying step further comprises assigning a penalty to said state likelihoods within said state sequences that is related to the difference between the state likelihoods of said state sequences and said corresponding maximum state likelihood.

4. The method as recited in claim 3, wherein said assigned penalty is proportional to the difference between the state likelihoods of said state sequences and said corresponding maximum state likelihood.

5. The method as recited in claim 3, wherein said assigned penalty is based on a function selected from the group consisting of a monotonic function and a look-up table.

6. The method as recited in claim 3, wherein said assigned penalty for a given state i of n states is based on a sigmoid function:

$$p(i,n) = \frac{g}{1 + e^{-\gamma d(i,n)+\theta}} - \frac{g}{1 + e^\theta}$$

wherein g corresponds to the maximum allowable penalty, θ corresponds to the minimum distance between a state likelihood and its corresponding maximum state likelihood in which a penalty is assigned, and γ controls the slope of the transition between the minimum possible penalty assigned and the maximum possible penalty assigned.

7. The method as recited in claim 1, further comprising the step of determining the maximum state likelihood corresponding to said state sequences.

8. The method as recited in claim 1, wherein said state sequences are modeled by hidden Markov models (HMMs), and wherein said determining step includes the use of the Viterbi algorithm.

9. A system for transmitting information including the receipt and decoding of speech information, said speech information including at least one state sequence having a plurality of states and given state likelihoods of transitions from state to state, said system comprising a decoder including a processor for comparing the state likelihoods of said state sequences to a corresponding maximum state likelihood, and for modifying said state likelihoods of said state sequences based on the differences between the state likelihoods of said state sequences and said corresponding maximum state likelihood, said processor decoding said speech information by determining the modified state sequences having the highest cumulative state likelihood.

10. The system as recited in claim 9, wherein said processor determines log-likelihoods for said state sequences and compares those log-likelihoods to said corresponding maximum state likelihood, and modifies said state sequences based on the differences between the log-likelihoods of said state sequences and said corresponding maximum state likelihood.

11. The system as recited in claim 9, wherein said processor modifies said state likelihoods by assigning a penalty thereto that is related to the difference between the state likelihoods of said state sequences and said corresponding maximum state likelihood.

12. The system as recited in claim 11, wherein said processor assigns a penalty that is proportional to the difference between the state likelihoods of said state sequences and said corresponding maximum state likelihood.

13. The system as recited in claim 11, wherein said processor assigns a penalty that based on a function selected from the group consisting of a monotonic function and a look-up table.

14. The system as recited in claim 11, wherein said processor assigns a penalty, for a given state i of n states, that is based on a sigmoid function:

$$p(i,n) = \frac{g}{1 + e^{-\gamma d(i,n) + \theta}} - \frac{g}{1 + e^{\theta}}$$

wherein g corresponds to the maximum allowable penalty, $\theta$ corresponds to the minimum distance between a state likelihood and its corresponding maximum state likelihood in which a penalty is assigned, and $\gamma$ controls the slope of the transition between the minimum possible penalty assigned and the maximum possible penalty assigned.

15. The system as recited in claim 9, wherein said state sequences are modeled by hidden Markov models (HMMs), and wherein said processor includes a Viterbi unit for determining the modified state sequence having the highest cumulative state likelihood.

16. The system as recited in claim 9, further comprising an acoustic model unit operably connected to said processor for providing an inventory of speech units for constraining said decoder.

17. The system as recited in claim 9, further comprising:

a lexicon unit operably connected to said processor for defining the vocabulary of the basic units of speech for use by said decoder; and a language model unit operably connected to said lexicon unit, said language model unit determining the allowable sequence of the vocabulary defined by said lexicon unit.

18. The system as recited in claim 9, wherein said decoder includes an input, wherein said system further comprises a preprocessor operably connected to said decoder input for converting said speech information signal into a form for use by said decoder.

* * * * *